United States Patent

[11] 3,578,949

[72] Inventor Paul M. Weyrick
 Ashland, Ohio
[21] Appl. No. 813,444
[22] Filed Apr. 4, 1969
[45] Patented May 18, 1971
[73] Assignee Westinghouse Electric Corporation
 Pittsburgh, Pa.

[54] COMBINATION BAKE AND AUXILIARY BROIL HEATER FOR A COOKING APPLIANCE
 5 Claims, 3 Drawing Figs.
[52] U.S. Cl. .................................. 219/403,
 99/340, 219/395, 219/404, 219/410
[51] Int. Cl. ........................................ F27d 11/02,
 H05b 1/00
[50] Field of Search ........................................ 219/410,
 409, 395-6-7-8, 393, 403-4; 99/340, 390

[56] References Cited
 UNITED STATES PATENTS
 1,897,879  2/1933  Antrim ..................... 219/403

| 1,982,386 | 11/1934 | Heinbuch | 219/403 |
| 2,668,222 | 2/1954 | McCormick | 219/403X |
| 2,836,697 | 5/1958 | Jordan | 219/403X |
| 2,872,558 | 2/1959 | Price | 219/409X |
| 3,005,082 | 10/1961 | Ammerman | 219/403X |
| 3,270,660 | 9/1966 | Filipak | 99/340 |
| 3,358,120 | 12/1967 | Schibley | 219/395 |

*Primary Examiner*—Volodymyr Y. Mayewsky
*Attorneys*—F. H. Henson, E. C. Arenz and B. B. Sklar, Jr.

ABSTRACT: Cooking apparatus having a heater structure which is utilized both as a bake heater and a auxiliary broil element. The heater structure is characterized by its capacity to distribute heat over the entire oven when used as a bake heater and to concentrate the heat when used as a auxiliary broil element, the former being accomplished while the heater structure is positioned adjacent the bottom wall of the oven liner and the latter while the structure is supported closer to the top wall thereof.

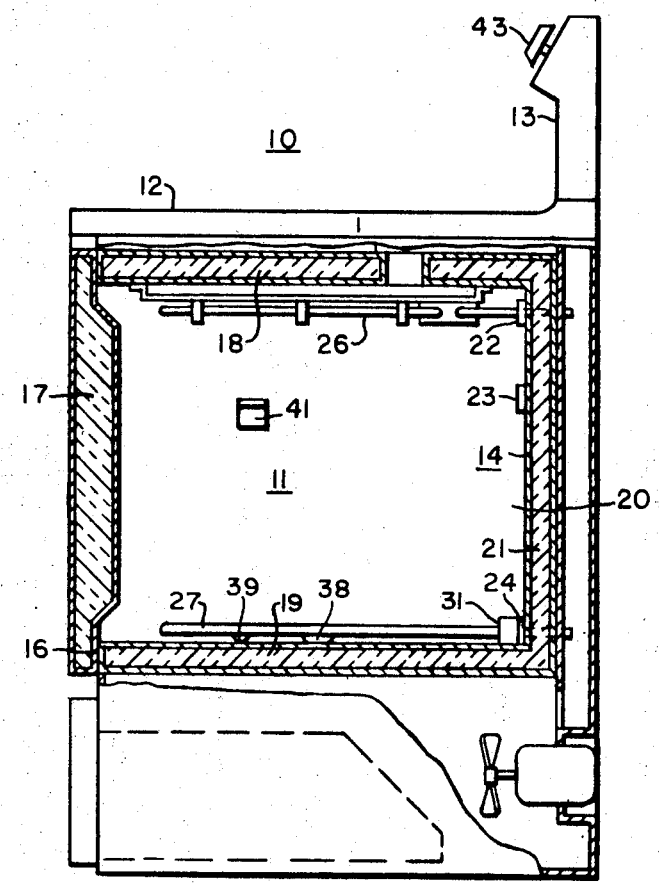
Fig. 1
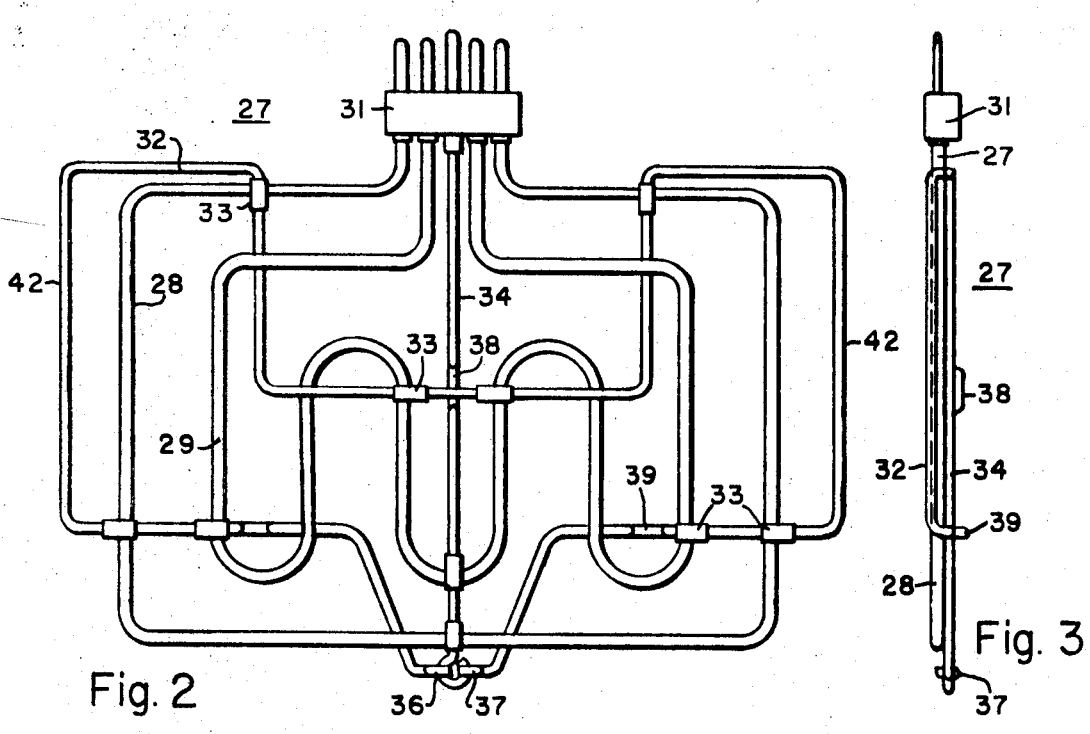
Fig. 2
Fig. 3

3,578,949

COMBINATION BAKE AND AUXILIARY BROIL HEATER FOR A COOKING APPLIANCE

BACKGROUND OF THE INVENTION

This invention relates, in general, to cooking apparatus and, more particularly, to heater structure for use therein.

One of the more recent innovations in food preparation is that wherein two broiler elements are used, one being disposed above the article to be broiled and the other being disposed below, as disclosed in U.S. Pat. No. 3,270,660. From the inception of the concept, the marketed ranges having this capability utilized three heater structures, one for conventional broiling, another auxiliary element for baking and still another for use with a conventional broil element for accomplishing the simultaneous opposite face broiling. The obviousness disadvantage of such arrangement is that of having to store the extra broil element when not in use.

The above-mentioned disadvantage has been solved by the provision of a single heater structure which is utilized for both bake and auxiliary broil operations. Such structure however, because of its construction (i.e. serpentine configuration) does not yield satisfactory baking. Such a configuration during the bake operation does not provide adequate heat at the extremities of the oven. This is because of the serpentine type heater has been spread out to take care of the baking operation, and is therefore not capable of providing the concentrated heat necessary for auxiliary broiling.

Accordingly, the general object of this invention is to provide a new and improved cooking apparatus.

It is a more particular object of this invention to provide a combination heater structure which can be utilized, in a full size oven, either as a bake heater or as a auxiliary broil-heating element.

BRIEF SUMMARY OF THE INVENTION

Briefly, the above-cited objects are accomplished by the provision, for use in the oven of a conventional size range, of a heater structure comprising two separate heating elements which cooperate to provide proper heat distribution whether the structure is used as a baking or auxiliary broiling element. One of the elements is substantially rectangular while the other has a serpentine configuration. The two elements are connected to a terminal block at their extremities and intermediate their extremities they are linked by means of a continuous wire frame interwoven through the elements. The heating element with the serpentine configuration is primarily for auxiliary broiling and is, consequently, of a lesser transverse extent than the bake-heating element and therefore lies within the perimeter thereof.

The wire frame is deformed at certain locations thereof to provide feet which contact the bottom wall of the oven when the heater structure is used as a bake heater. The wire frame is constructed such that it has sidewardly projecting portions which are adapted to rest on support members projecting inwardly from the sidewalls of the oven.

Further objects and advantages of the present invention will become more apparent when considered in view of the drawings and detailed description of the preferred embodiment forming a part hereof.

DESCRIPTION OF THE DRAWINGS

FIG. 1 is a side elevational view, in cross section of a range incorporating the present invention;

FIG. 2 is a top plan view of a heater structure representing the invention; and

FIG. 3 is a side elevational view of the heater structure shown in FIG. 2.

DESCRIPTION OF THE PREFERRED EMBODIMENT

Referring to the drawings, especially FIG. 1, reference character 10 designates generally an electric range. The range comprises cabinet structure 11 including a top wall 12 supporting a back splasher panel 13 and a number of surface heating units (not shown).

An oven liner 14 having an open front 16 is supported within the cabinet structure 11 and a door structure 17 serves to provide access to the interior of the oven liner. The oven liner comprises top, bottom, side and rear walls, 18, 19, 20 and 21, respectively.

A plurality of receptacles 22, 23 and 24 are provided in the rear wall 21 for receiving heater structures 26 and 27, the former of which is strictly a auxiliary broil-heating element or conventional broil element and the latter of which is a combination heater structure adapted for use as either a bake heater or a auxiliary broil element. The heater structure 26 is insertable only in the receptacle 22 and may be permanently installed therein.

The heater structure 27, as best shown in FIG. 2, comprises a first heating element 28 which is preferably of the tubular sheath type, and a second heating element 29 of the same construction. The terminal portions of each of these heating elements are received in a terminal block 31 through which the tips of the elements extend, for insertion in the receptacles 23 and 24. The element 28 has a substantially rectangular configuration while the element 29 has a generally serpentine configuration and is disposed within the area delineated by the element 28.

A wire form 32 is interwoven between the heating elements 28 and 29 and is attached thereto by a plurality of brackets 33 welded to the wire form 32. A rod 34 attached to the looped ends 36 and 37 of the wire form 32 and carried by the terminal block 31 serves to ground the heater structure when installed in one of the receptacles 23 or 24. As viewed in FIGS. 2 and 3, the wire form 32 and the rod 34 form a support frame for the heater structure 27, and to this end they are formed as indicated at 38 and 39 to provide feet which rest on the bottom wall 19 of the oven liner, when the heater structure 27 is received in the receptacle 24.

A pair of support brackets 41 (only one being shown) are attached, one each, to opposite sidewalls 20 of the oven liner. Sidewardly extending portions 42 of the wire form 32 rests on the brackets 41 to thereby support the heater structure in a auxiliary broil position wherein it is received in the receptacle 23.

In operation the heater structures 26 and 27 are energized by manipulation of a control knob 43 carried by the back splasher panel 13. As pointed out previously, the heater structure 26 may be permanently installed (i.e. wired in lieu of being of the plug-in type), however, the structure 27 in accordance with the invention can only be of the plug-in type. When used as a bake unit the heater element 28 is operated at full wattage, 236 volts, thereby producing the rated wattage, while the element 29 is operated at half voltage to produce one-fourth of the rated wattage. It should be noted that the heater structure 27 is, alone energized, during the bake operation. During the auxiliary broil operation, the heater structure 27 is received in the receptacle 23 and the element 29 is energized simultaneously with the heater structure 26 which has a serpentine configuration of equal size and capacity to the heating element 28.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

I claim:

1. Domestic-cooking apparatus including:
   an oven cavity defined at the top and the bottom by a top wall and a bottom wall, respectively;
   an electrical-broiling element closely underlying said top wall;
   electrical-heating element means comprising first and second electrically independent loops in substantially the same plane, said first loop, in outline, encompassing a substantially greater area than said second loop and generally encompassing said second loop;

frame means for supporting said electrical-heating element means in a first position for baking in which said electrical-heating element means is located closely adjacent and overlying said bottom wall, and a second position for effecting broiling of the lower face of a food article located above said electrical-heating element means in which said electrical-heating element means is located at an intermediate height in said cavity;

electrical means for selectively energizing said first and second loops in accordance with the intended cooking mode, including means for energizing said first loop at full wattage and said second loop at quarter wattage when said electrical-heating element means is in its baking position, and for energizing only said second loop and at full wattage when said electrical-heating element means is in said broiling position; and electrical means for energizing said electrical-broiling element simultaneously with said electrical-heating element means in said broiling position.

2. Apparatus as specified in claim 6 wherein: said supporting frame means being connected to said two loops and having deformed areas thereof which provide feet for contacting said bottom wall of said oven when said electrical-heating element means is used in said baking position.

3. Apparatus as specified in claim 7 wherein: said supporting frame means includes sidewardly projecting portions thereof for supporting said electrical-heating element means in said broiling position.

4. Apparatus as specified in claim 8 wherein: said supporting frame means is a continuous structure interwoven through said loops.

5. Apparatus as specified in claim 6 wherein: said first loop has a substantially rectangular configuration and said second loop includes a serpentine configuration.